Patented July 10, 1951

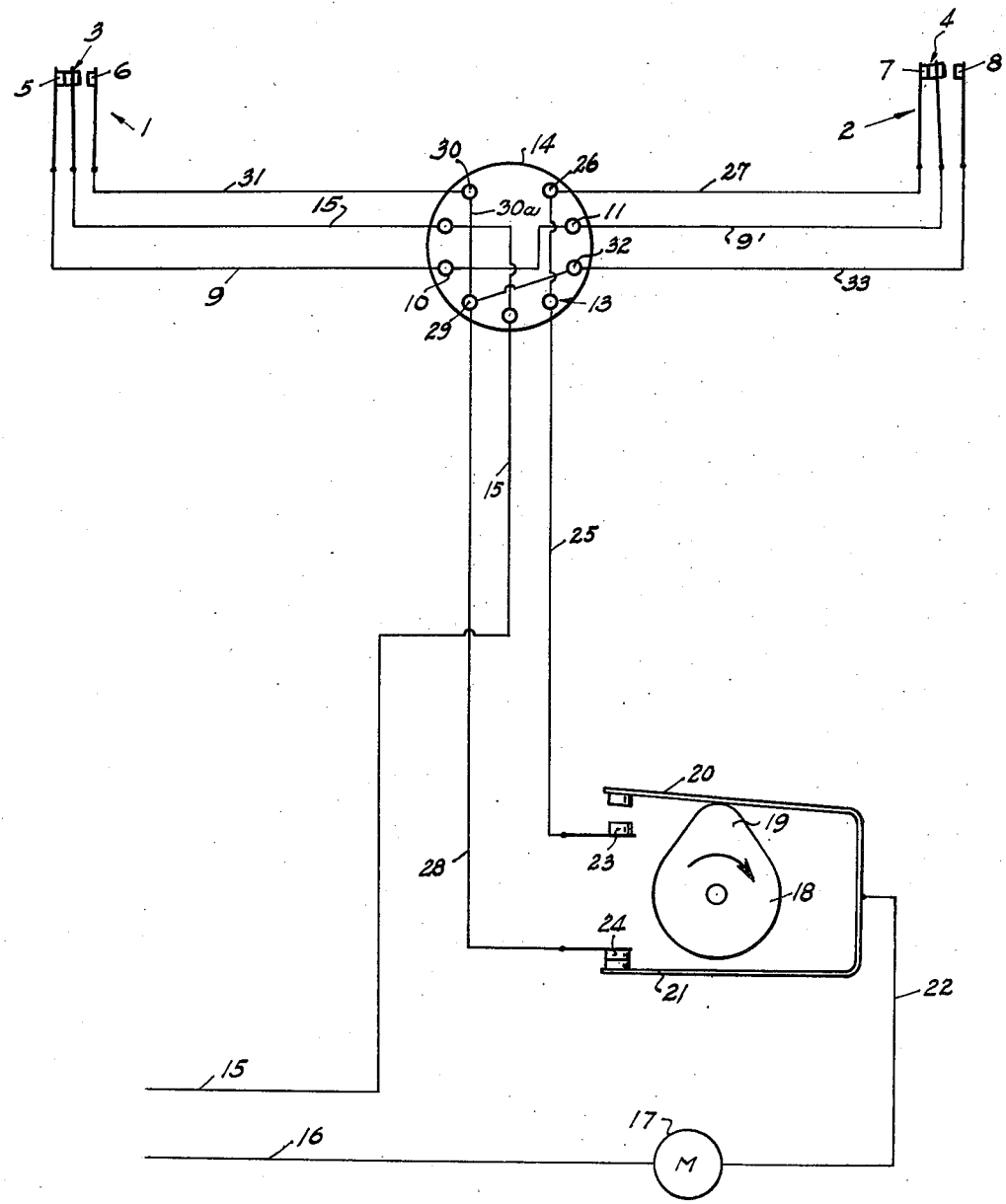

2,560,322

UNITED STATES PATENT OFFICE 2,560,322

MEANS FOR CONTROLLING TEMPERATURE FROM A PLURALITY OF REMOTE POINTS OR ZONES

Charles Eric Armstrong, Portland, Oreg., assignor to Electric Controls Inc., Portland, Oreg.

Application October 21, 1948, Serial No. 55,688

1 Claim. (Cl. 236—74)

This invention relates to a method of, and means for controlling temperature or apparatus for meeting heat requirements from a plurality of remotely disposed zones or locations.

It is one of the principal objects of the invention to provide a new and novel means in the form of what might be termed a union or collector wherein a plurality of electrical circuits extending to said remotely disposed zones are conveniently interconnected in a compact manner and in turn connected with their various terminal points of application, such for instance as motorized steam valves, motor actuated furnaces, and various other types of electrically controlled heating systems.

By my new and novel method I am able to electrically interconnect a plurality of remotely disposed thermostats with each other for individually closing a circuit to said heating system in some instances, and to close said circuit collectively in other instances by a simple three-wire circuit. For example, I am able to arrange one side of each thermostat in such a manner that they will be connected in multiple and therefore each being capable of actuating the heating system to supply heat in the particular zone in which any one of the thermostats becomes active due to the absence of heat, and also connect the other side of said thermostat in such a manner that they are all connected in series and whereby they must all close in order to cut off the supply of heat to said zones or spaces.

This novel arrangement and manner of interconnecting said thermostats whereby one of their sides may function individually by being connected in multiple, as above pointed out, and the other side being connected in series whereby they can only function collectively is particularly advantageous in installations where a motorized valve requires the closing of a circuit to its motor for closing the valve and the closing of another circuit for opening the valve.

These and other objects will appear as my invention is more fully hereinafter described in the following specification illustrated in the accompanying drawing and finally pointed out in the appended claim.

The figure in the drawing is a diagrammatic layout of the invention and a wiring diagram of the electrical interconnections of the various elements of the invention.

With particular reference to the drawing:

My system includes two or more thermostats generally indicated at 1 and 2 disposed at remote locations in a building or space to be heated.

Each thermostat is of the snap-acting type including moveable contacts 3 and 4 cooperating with fixed contacts 5—6, and 7—8. The fixed contact 5 of thermostat 1 is electrically connected by wires 9 and $9^1$ with the movable contact 4 of thermostat 2 through the medium of two interconnected binding posts 10 and 11 of a series of binding posts electrically interconnected as shown and mounted upon a base 14 of insulating material. The movable contact 3 of thermostat 1 is connected by wire 15 with one side of an electric power supply line. The opposite side of the power supply line is connected by wire 16 with a motor 17 connected with and adapted to rotate a cam member 18 in the direction of the arrow applied to it. Arranged in the path of rotation of the lobe 19 of the cam are two movable contact arms 20 and 21 constituting a motor switch and formed of a single piece of spring phosphor bronze folded back on itself as shown and connected by wire 22 with the opposite side of the motor 17. Arranged in the path of movement of the contacts carried by the contact arms 20 and 21 are two fixed contacts 23 and 24 adapted to be alternately contacted by the contacts 20 and 21 upon rotation of the cam 18. The fixed contact 23 is connected by wire 25 through binding post 13 and another of said binding posts 26 and wire 27 with the fixed contact 7 of thermostat 2. The other fixed contact 24 of the motor switch is connected by wire 28 with other of the binding posts indicated at 29—30 by wire 30a and by wire 31 with the fixed contact 6 of the thermostat 1. This same fixed contact 24 is also connected through binding post 29 and another binding post 32 and wire 33 with the fixed contact 8 of the thermostat 2.

The operation of the system is as follows: Let it be assumed that the motor 17 is operatively connected with a heat supplying system such for example as motor operated steam valves and adapted to open the valves to supply heat to a zone where it is needed and to close the valves when the temperature requirements of that zone have been satisfied.

Thermostats 1 and 2 as shown are both standing in the "heat off" or satisfied position. The motor 17 has been actuated to rotate the heat-supplying valve or valves to a closed position. Now if either thermostat calls for heat, either thermostat can actuate the motor to open the valve. For example, if a temperature drop occurs in the location of thermostat 1, movable contact 3 will move over and engage contact 6. Circuit will then be completed through wire 31, post 30, wire 30A, post 29, wire 28, contact 24, contact arm 21 through wire 22 to motor 17 and through wire 16 back to the source. The motor will then commence to run and continue to run until cam 19 and lobe rotate in the direction of the arrow and break the circuit between 24 and 21 thus causing the motor to come to rest with the valve in an open heat-supplying position. If on the other hand, for example, a temperature drop had occurred in the location of thermostat 2 but had not occurred in the location of thermostat 1, then thermostat 2 can actuate the motor to open the valve to supply heat. Tracing circuit 15 it will be seen that it passes through contacts 3 and 5 to wire 9, post 10, post 11, wire 9' to movable contact 4 of thermostat 2 and over to contact 8 then through wire 33, post 32, post 29, wire 28, contact 24, contact arm 21, wire 22 and to motor 17, thus causing the motor to rotate in the same manner as described in the example while thermostat 1 was calling for heat.

The wiring diagram shown in the drawing shows both thermostats 1 and 2 in "heat-off" or satisfied positions with the valve standing in a closed position.

While I have shown a particular form of embodiment of my invention, I am aware that many minor changes therein will readily suggest themselves to others skilled in the art without departing from the spirit and scope of the invention. Having thus described my invention, what I claim as new and desire to protect by Letters Patent is:

A heat regulating system comprising in combination a pair of thermostats disposed in locations remote from each other in a space to be heated, each of said thermostats having fixed contacts and one movable contact, the movable contact of one of said thermostats being directly connected with one side of a source of electrical energy, the movable contact of the other of said thermostats being directly connected with one of the fixed contacts of the first mentioned thermostat, the other fixed contact of said first mentioned thermostat being electrically connected with a fixed contact of a switching mechanism for actuating heat releasing means, one of the fixed contacts of the other of said thermostats being connected with another fixed contact of said heat releasing means and the other fixed contact of said last mentioned thermostat being connected with said first mentioned fixed contact of said heat releasing means, whereby, upon actuation of the movable contact in the first mentioned thermostat into contact with either one of its said fixed contacts will direct current either directly to said switching mechanism or through said second thermostat to the switching mechanism.

CHARLES ERIC ARMSTRONG.

REFERENCES CITED

The following references are of record in the file of this patent:

UNITED STATES PATENTS

| Number | Name | Date |
|---|---|---|
| 378,137 | Johnson | Feb. 21, 1888 |
| 2,054,331 | Locke | Sept. 15, 1936 |
| 2,153,382 | Martin | Apr. 4, 1939 |
| 2,249,844 | Martin | July 22, 1941 |
| 2,257,472 | McGrath | Sept. 30, 1941 |